United States Patent
Ackermann

[15] 3,636,406
[45] Jan. 18, 1972

[54] ELECTRONIC FLASH UNIT
[72] Inventor: Karl Ackermann, Berlin, Germany
[73] Assignee: Robert Bosch Photokino GmbH, Stuttgart-Unterturkheim, Germany
[22] Filed: Dec. 15, 1969
[21] Appl. No.: 884,794

[30] Foreign Application Priority Data

Apr. 19, 1969 Germany............P 19 20 036.3

[52] U.S. Cl................................315/241, 320/1
[51] Int. Cl. .......................................H05b 41/00
[58] Field of Search.............315/151, 241, 241 P; 320/1

[56] References Cited

UNITED STATES PATENTS

| 3,340,426 | 9/1967 | Elliott | 315/241 X |
| 3,350,603 | 10/1967 | Erickson | 315/241 P |
| 3,487,221 | 12/1969 | Frank | 315/241 P |
| 3,517,255 | 6/1970 | Hoffer et al. | 315/151 |

Primary Examiner—Roy Lake
Assistant Examiner—Lawrence J. Dahl
Attorney—Michael S. Striker

[57] ABSTRACT

A quench tube is connected in parallel with the flash tube. A control signal for initiating the flash or the quenching operation is derived selectively from a measuring and control circuit by the operation of a switch. Thus the unit may be used alternatively to provide automatic flash control or to initiate the flash in response to light from another flash unit.

10 Claims, 2 Drawing Figures

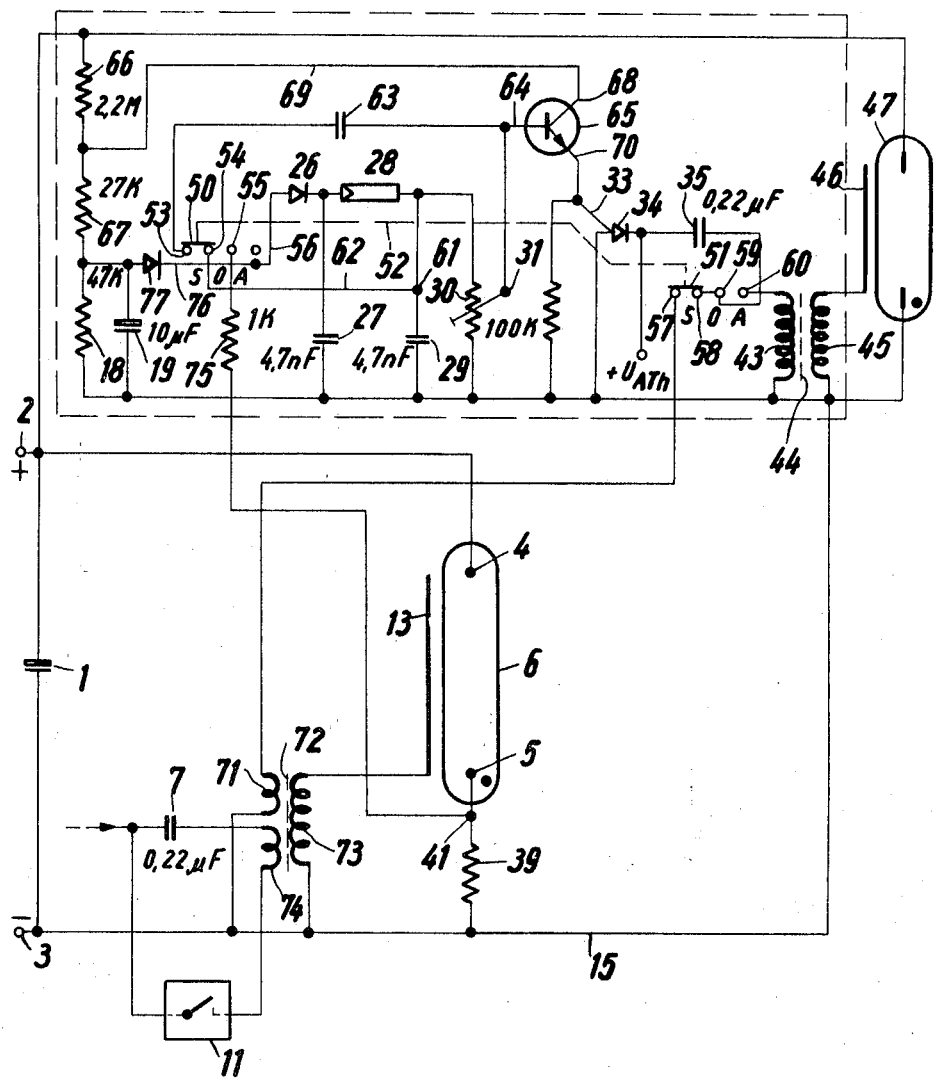

ELECTRONIC FLASH UNIT

BACKGROUND OF THE INVENTION

This invention relates to an electronic flash unit. In particular, it relates to electronic flash units with automatic control of the duration of a flash. In this type of flash unit, the flash tube is connected in parallel to a quench tube. A control signal applied to the quench tube causes a substantial short-circuiting of the flash tube, thus terminating the light flash. In the conventional units, the control signal causing the termination of the light flash, is furnished by a measuring and control circuit. The measuring and control circuit comprises a photoelectric element which furnishes a signal corresponding to the amount of light utilized in the photographic process, for example, the amount of light reflected back from an object to be photographed. The photoelectric signal, for example a current, is then integrated, for example by use of a capacitor. When the total amount of light reflected from the object has reached a predetermined value, a control signal is furnished by the measuring and control circuit. This control signal is applied to an ignition circuit of the quench tube, thus causing the termination of the light flash.

By use of the above-mentioned equipment, it is possible to operate at a fixed lens opening, since the correct illumination of the object is achieved by the above-described termination of the flash, which in turn is initiated when the object to be photographed has been properly illuminated.

The photoelectric element mentioned above may for example be a photoresistance whose resistance varies as a function of illumination falling thereon. Such a resistance may be utilized in a circuit wherein the current flow is a function of said resistance. The current may in turn be used to charge a capacitor, the control signal being furnished when the voltage on the capacitor has reached a predetermined value. Of course, the resistance offered by the quench tube after ignition must be low compared with the resistance of the flash tube after ignition, or the short-circuiting of the flash tube by the quench tube will not cause sufficient energy to be removed from the flash tube in order to terminate the flash.

Another class of flash units is known, which differs from the basic flash unit without automatic control in that a photoelectric element functions in conjunction with an electronic control circuit in order to permit initiation of a flash operation. The photosensitive part of the photoelectric element is mounted on the front surface of the housing of the flash unit for this purpose. For example, another flash unit (the main flash unit) may be generating a light flash in another location. The flash generated by this main flash unit falls upon the photoelectric element of the flash unit under discussion, causing the additional electronic control circuit to furnish a control signal for initiating the flash, that is, the control signal is applied to the ignition circuit of the flash tube. In this manner, it is possible to illuminate the object to be photographed by two flash units, without the requirement that the two units are connected by an electric cable, and permitting the two units to be located in different locations.

SUMMARY OF THE INVENTION

The basic consideration underlying the present invention is, that it should be possible to furnish an electronic flash unit which combines the two above-described functions, namely the automatic termination of a flash originating from the unit, and the initiation of the flash in the unit in response to externally furnished light, within a single electronic flash unit.

It is therefore an object of the present invention to furnish such a combined flash unit with a minimum of additional components as compared to a flash unit operating to fulfill only one of the above-described functions.

The present invention thus comprises an electronic flash unit which has light-flash-generating means for generating a light flash in response to a control signal applied to said light-flash-generating means. The flash unit further comprises terminating means connected to said light-flash-generating means for terminating said light flash in response to a control signal applied to said terminating means. Further furnished is a measuring and control circuit having a photoelectric element mounted to receive light indicative of the light utilized in the photoelectric process. This measuring and control circuit is adapted to furnish a control signal when the quantity of light falling on said photoelectric element has reached a predetermined value. Finally, switching means are provided for selectively interconnecting said measuring and control circuit means and said light-flash-generating means or said terminating means, whereby said measuring and control circuit means functions selectively to terminate the flash generated by the light-flash-generating means or to initiate a light flash in response to externally furnished illumination.

The light-flash-generating means may be a flash tube, while the terminating means may be a gaseous discharge device connected in parallel with the flash tube and adapted to short circuit said flash tube when a control signal is applied to the quench tube ignition circuit.

An electronic flash unit with the above characteristics differs from a unit with automatic control of the duration of the flash simply by the inclusion of a single pole switch and its interconnecting wiring. This of course represents an extremely small amount of equipment relative to the total equipment required for such a unit. Further, the amount of space occupied by this additional equipment is also negligible, causing the combined unit to have substantially, or even precisely the same size as the unit having only automatic control of the flash duration.

In a preferred embodiment of the present invention, the control voltage, or output of the measuring and control circuit means, is applied selectively to the ignition circuit of the quench tube or the ignition circuit of the flash tube, in dependence on the use to which the flash unit is being put. Furthermore, it may be advantageous that the switching means also function to select the operating voltage source for the measuring and control circuit in dependence on the use to which the flash unit is being put.

This possibility of switching the operating voltage in dependence upon the use to which the flash tube is being put, must be provided whenever it is essential that the measuring and control circuit means remain insensitive to flashes emanating from other electronic flash units; that is, when the flash unit is being used to automatically terminate the flash, and it is desired that no light furnished by other flash units influence determination of the light flash in the unit which is the subject of this invention. For this type of operation, it is known that the operating voltage for the measuring and control circuit may be furnished only during the duration of the flash, as, for example, by a voltage developed across a resistance which is electrically connected into the circuit of the flash tube. The value of the resistance must be such that the voltage developed across it while the flash tube is ignited, is sufficiently large to constitute the operating voltage for the measuring and control circuit.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is an alternate embodiment, with an expanded measuring and control circuit.

DESCRIPTION OF THE PREFERRED EMBODIMENT

Figure 1:
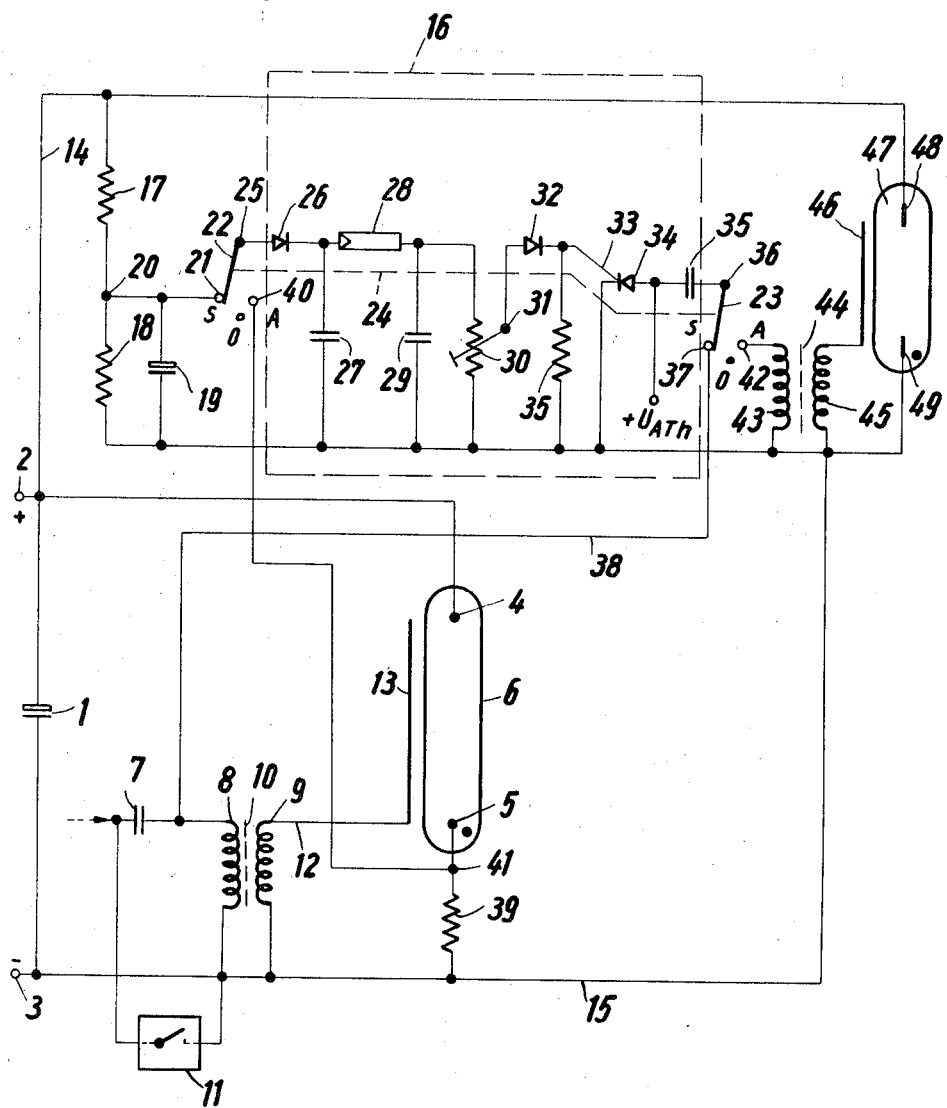
FIG. 1 is a simplified circuit diagram for a flash unit in accordance with the present invention.

The preferred embodiment of the present invention is now going to be discussed in relation to the drawing.

Numeral 1, in FIG. 1, designates a storage capacitor associated with the electronic flash unit, whose terminals 2 and 3 are connected to a direct current high-voltage source which is not illustrated in the drawing. A flash tube, one embodiment of light-flash-generating means, has a first electrode 4 connected to what may, for example, be positive terminal 2, and a second electrode 5, connected to what may, for example, be the negative terminal 3 of capacitor 1. The flash tube ignition circuit, namely, the ignition circuit for flash tube 6, comprises a capacitor 7 which is charged to a voltage which is a fraction of the voltage of capacitor 1, and ignition transformer 10 having a primary winding 8 and a secondary winding 9, and a switch 11 which may be operated manually or through the contact of the camera in order to initiate a flash. Terminal 12 of secondary winding 9 is connected to ignition electrode 13 of the flash tube. A connecting line 14 connects the positive terminal 2 to one end of a voltage divider comprising a series combination of resistors 17 and 18, while a line 15 connects the negative terminal 3 to the other extreme of the voltage divider. The resistor 18 is connected in parallel to a capacitor 19. Resistors 17 and 18, in conjunction with capacitor 19, constitute the first operating voltage-furnishing means for furnishing an operating voltage to the measuring and control circuit means, which will be described below. The common point 20 of resistors 17 and 18, is connected to a terminal 21 which, together with two mechanically coupled switching arms 22 and 23 constitute part of the switching means. The dashed line 24 in FIG. 1 indicates the mechanical coupling between the arms 22 and 23. As indicated in FIG. 1, a contact 25 may be selectively connected via switching arm 22 to one of three contacts labeled S, O, or A. In FIG. 1, the switching arm 22 connects terminal 25 to terminal S which is the position corresponding to the operating condition in which the flash in tube 6 is initiated by a flash emanating from another flash unit. The actual measuring and control circuit means, labeled 16 in FIG. 1, comprise a diode 26 having an anode connected to terminal 25 and a cathode connected to a capacitor 27 whose other terminal is connected to the negative supply terminal. The cathode of diode 26 is further connected to a photoelectric element 28, which may for example be a photoresistance. A capacitor 29 which serves as an integrating capacitor, is connected to the other terminal of the photoelectric element 28. The other terminal of capacitor 29 is connected also to the negative supply terminal. A potentiometer 30 is connected parallel to capacitor 29. The wiper arm 31 of the potentiometer is connected to the anode of a diode 32 whose cathode is connected to the negative supply terminal via a resistance 35. The cathode of diode 32 is also connected to the control electrode 33 of a thyristor 34. The cathode of thyristor 34 is connected to the negative terminal 3, while the anode is connected to a fixed voltage +$U_{ATh}$, which is derived from the voltage across the storage capacitor 1. The anode of thyristor 34 is further connected to an ignition capacitor 35, whose opposite terminal is connected to a terminal 36 which is also part of the switching means. The movable arm 23 serves to connect the terminal 36 selectively to a terminal S, O, or A. In FIG. 1, terminal 36 is shown connected to terminal S, as was mentioned above, which is also designated by the numeral 37. Terminal 37 is connected by line 38 to the primary winding 8 of the ignition transformer 10.

The circuitry described above is, as mentioned above, designed to initiate a flash in response to light received from another flash unit and fulfills the following functions: After a short charging time, the voltage across capacitor 1, that is the voltage appearing between terminals 2 and 3, and thus between electrodes 4 and 5 of the flash tube 6, is a direct voltage of, for example, 500 volts. Initially, no voltage appears across the relatively low resistor 29, since the flash tube is not ignited. The measuring and control circuit receives an operating voltage, namely the voltage appearing across resistance 18 and smoothed by means of a capacitor 19, which is applied to capacitor 27 via the movable contact arm 22 and diode 26. This capacitor thus charges to its maximum voltage. A quiescent current flows through the at first unilluminated photoresistance 28, causing a small charge to appear across capacitor 29. Part of the voltage appearing across capacitor 29 is applied to control electrode 33 of thyristor 34. The particular portion of the voltage to be applied to the control electrode is determined in advance by the setting of the potentiometer 30. This setting may, for example, correspond to the sensitivity of the particular film used. The anode-cathode circuit of thyristor 34 is initially nonconductive, since the voltage appearing between the cathode of the thyristor and its control electrode 33, is too low when the photoresistance is unilluminated to allow the thyristor to become conductive. As long as thyristor 34 is blocked, capacitor 35, which is connected to the voltage $U_{ATh}$ cannot discharge and retains its charge completely.

If now light originating from another flash unit falls onto photoresistance 28, this photoresistance has a decreasing resistance value, thus permitting a larger current to flow from capacitor 27 to the integrating capacitor 29. Capacitor 29 therefore charges to a higher voltage which serves as the control voltage for thyristor 34 and causes the thyristor to become conductive. This in turn permits the ignition capacitor 35 to discharge via the anode-cathode circuit of the thyristor and the primary winding 8. Thus a current pulse appears in the primary winding 8 which causes the flash tube 6 to ignite, since it causes a corresponding current pulse to appear in the secondary winding 9 and thus at the ignition electrode 13.

In another switching position, called the third switching position herein, the contact 22 is connected to the contact O. In this position, the relevant parts of the measuring and control circuit, and in particular the photoresistor 28 and thyristor 34 are disconnected, since the electrical connection between terminals 21 and 25 is broken. The electronic flash unit may then operate like an electronic flash unit without automatic control and without the ability to initiate a flash in response to an externally furnished light. That is, a flash can be initiated by means of the closing of contact 11, which may be affected manually or via a contact in the camera. This causes the previously charged capacitor 7 to discharge over the momentarily closed contact 11 and the primary winding 8, thus causing a pulse to appear in winding 9, initiating the flash as described above.

The last switching position to be described, and called the second switching position herein, is the position wherein the contact 25 is connected to the contact A, also designated by the numeral 40, by means of the movable contact arm 21. Similarly, contact 36 is connected to contact 42, also designated A, by means of the movable contact arm 23.

Considering first the input side, terminal 40 is directly connected to a terminal 41 which is the common point of the electrode 5 of flash tube 6 and the resistor 39 which is connected in series with said flash tube. At the output side, the terminal 42 is connected to the primary winding 43 of a quench tube ignition transformer 44 whose secondary winding 45 has one terminal connected to the control electrode 46 of the quench tube 47, while the other terminal is connected to the negative supply terminal. The quench tube 47, one embodiment of terminating means, has a first electrode 48 connected to the positive supply voltage and a second electrode 49 connected to the negative supply voltage. The quench tube 47 is thus connected parallel to the flash tube 6.

In this switching position, the flash unit operates to terminate automatically a flash originating in flash tube 6. The operation is as follows.

The switch 11 is momentarily depressed, causing capacitor 7 to discharge via primary winding 8, thus igniting flash tube 6 as described above. The voltage appearing across resistance 39 while the flash tube is ignited, causes capacitor 27 to charge via diode 26 and the now-connected switching contacts 40 and 25. At the beginning of the flash, the potential at point 41 rises rapidly and then decreases. Thus capacitor 27 is charged relatively rapidly to its maximum value and then remains at substantially with value since diode 26 prevents any discharge of the capacitor when the voltage at point 41, that is the voltage across resistance 39, decreases.

During the flash, the light reflected by the object to be photographed, falls upon photoresistance 28 which may, for example, be mounted on the front surface of the electronic flash unit. Thus, the resistance of photoresistance 28 decreases allowing a larger current to flow from the capacitor 27 to the integrating capacitor 29. This integration by capacitor 29 of the individual current elements with respect to time causes the voltage across the capacitor to rise slowly. This in turn causes the voltage applied to the control electrode 33 of thyristor 34 to increase as described above in relation to the alternate modes of operation, and causes thyristor 34 to become conductive when a predetermined value (THRESHOLD VALUE) is reached. Capacitor 35, which was charged previously, then discharges via the thyristor and primary winding 43 of the quench tube ignition transformer 44. The current pulse generated in the primary winding causes a corresponding current pulse to be generated in the secondary winding 45 which is thus in the ignition circuit of quench tube 47, since it is applied between the electrode 49 and the ignition electrode 46. Since quench tube 47 in the ignited condition has a considerably lower internal impedance than the flash tube 6 which is connected in parallel with it, the ignition of the quench tube causes the flash tube to be extinguished, since most of the energy supplied by capacitor 1 is absorbed by the quench tube.

A second preferred embodiment of the present invention is shown in FIG. 2. The circuit of this embodiment has been proven very effective in practice. Since this circuit corresponds to a great extent to the circuit shown in FIG. 1, corresponding parts in the two Figures have been given the same reference numbers. In the following discussion, only those circuit elements which are different for FIGS. 2 and 1, will be discussed in combination with their operation in the overall circuit.

It will be seen that the switching means utilized in the present embodiment, namely the embodiment shown in FIG. 2, differ somewhat from the corresponding switching means shown in FIG. 1. In particular, the switching means comprise a slider 50 which simultaneously bridges any two sequential contacts of four fixed contacts labeled 53, 54, 55 and 56. Similarly, at the output of the measuring and control circuit, the switching means comprise a slider 51 mechanically coupled to slider 50 which simultaneously bridges any two adjacent ones of four fixed contacts 57, 58, 59 and 60. The switching means again have three switching positions, the first switching position corresponding to an ignition of the flash tube 6 by externally supplied light, namely the position wherein contacts 53 and 54; and 57 and 58 are bridged, respectively, by sliders 50 and 51; the second switching position wherein automatic termination of the flash generated by flash tube 6 is achieved, namely the position wherein contacts 55 and 56; and 59 and 60 are respectively bridged by sliders 50 and 51. Finally, in the third switching position, sliders 50 and 51 respectively assume the positions wherein contacts 54 and 55; and 58 and 59 are bridged.

As stated above, in the first switching position, which is shown in FIG. 2, contact 51 bridges contacts 57 and 58, while contact or slider 50 bridges contacts 53 and 54. This causes a connection to be achieved between a terminal 61 which is situated at the common point of photoresistance 28 and capacitor 29 to one terminal of a capacitor 63 whose other terminal is connected to the base terminal 64 of a transistor 65. The base of transistor 65 is further connected to the wiper arm 31 of potentiometer 30. The time constant of the circuit formed by capacitor 63 and the part of the potentiometer 30 which is not bypassed by said capacitor, is chosen in such a manner that the measuring and control circuit as shown in FIG. 1, responds relatively rapidly to initiate a flash in response to externally furnished light, as for example light furnished by the main electronic flash unit. Transistor 65 serves to effect an impedance match between the measuring part of the measuring and control circuit, which comprises the photoresistance 28, and the control portion which comprises the control circuit of thyristor 34. The collector terminal 68 of transistor 65 is connected to the common point of resistors 66 and 67 which form a voltage divider replacing resistance 17 of FIG. 1, via line 69. The emitter terminal 70 of transistor 65 is connected to the control electrode 33 of thyristor 34. The voltage for driving the transistor 65 is derived from potentiometer 30.

As mentioned above, in the presently discussed switching position S, contacts 57 and 58 are bridged by slider 51. Since, a fixed connection exists between contacts 58 and 59, the terminal of capacitor 35 which is not connected to the anode of thyristor 34 is connected to one terminal of the first primary winding 71 of ignition transformer 72. The other terminal of primary winding 71 is connected to the negative supply voltage, namely terminal 3. When capacitor 1 is charged, capacitor 35 may in turn charge to a voltage corresponding to the voltage $+U_{ATh}$ minus the drop across the primary winding 71, while the thyristor 34 is blocked. If now part of the light generated by the flash tube 6 falls upon photoresistance 28, then, as previously explained in relation to FIG. 1, capacitor 29 continues to charge and the voltage appearing at terminal 61 is applied to the base of transistor 65 via line 62, slider 50 and capacitor 63. The collector-emitter impedance of transistor 65 then decreases and thyristor 34 becomes conductive. This allows capacitor 35 to discharge via the thyristor, the bridged contacts 59, 58 and 57, and the first primary winding 71 of transformer 72. The current thus applied to primary winding 71 induces a voltage in the secondary winding 73, which causes flash tube 6 to be ignited via its ignition electrode 13.

In the third switching position (position 0), contacts 54 and 55 are bridged by slider 50, while contacts 58 and 49 are bridged by slider 51. The electronic flash unit may, in this position, be used as an ordinary electronic flash wherein the flash is activated by means of the activation of a contact, namely contact 11. This contact may be activated in synchronism with the camera contact. It is true that in this switching position, an operating voltage, derived from the main supply source, is supplied to the measuring and control circuit. Thus, light from a photoflash falling upon the photoresistor, might cause thyristor 34 to become conductive. However, there is no connection between contact 58 and the primary winding 71, thus preventing the capacitor 35 from discharging. Quench tube 47 cannot be ignited either, since no connection exists between contacts 59 and 60, that is, there is no connection either between ignition capacitor 35 and ignition transformer 44. Thus, a flash can only be initiated by closing of contact 11, thus, analogous to FIG. 1, causing the ignition capacitor 7 to discharge over a second primary winding 74 of ignition transformer 72, whereby, in turn, a voltage is induced in the secondary winding 73, causing an ignition of flash tube 6 via the ignition electrode 13.

It will be noted that a DC voltage appears at circuit point 41 when the flash tube 6 is ignited. This voltage is applied to circuit point 61 of the measuring and control circuit via a decoupling resistor 75, the contacts 54 and 55 which are bridged by slider 50, and line 62. However, this potential cannot contribute to the ignition of the quench tube, because the connection between the ignition capacitor 35 and the ignition transformer 44 is broken by the fact that contacts 59 and 60 are not bridged. The flash ignited by the closing of contact 11 thus continues without any termination by the quench tube 47.

In the second switching position (position A) automatic control of the duration of the light flash is achieved. Contacts 55 and 56 are bridged by slider 50, while contact 59 and 60 are bridged by slider 51.

When contact 11 is closed momentarily, ignition capacitor 7 discharges over the second primary winding 74 of ignition transformer 72. The voltage induced in the secondary winding 73 causes an ignition of the flash tube 6 via its ignition electrode 13. The voltage developed across resistor 39 when the flash tube is conducting allows a DC voltage to appear at circuit point 41 which is applied to the anode of diode 26 via the decoupling resistor 75 and the bridged contacts 55 and 56. It will be noted that diode 77 is connected in such a manner as to block current flow over line 76 resulting from the potential at point 41. The capacitor 27, which has been charged to a DC voltage derived from the voltage divider 18 and furnished via diodes 77 and 26, receives additional charge due to the DC potential mentioned above, when the flash tube is ignited. The resistance of photoresistor 28 is influenced by the light reflected from the object to be photographed, and this resistor permits a proportionally larger current flow as the reflected light increases. Thus integrating capacitor 29 is charged. A determined portion of the voltage developed across capacitor 29 is derived from potentiometer 30 via the wiper arm 31 and is used as a control voltage for transistor 65. If capacitor 29 has been charged to a particular voltage, then thyristor 34 which is controlled by transistor 65, becomes conductive, thus furnishing a discharge circuit for capacitor 35 which comprises the cathode-anode circuit of the thyristor and the primary winding 43 of ignition transformer 44. The current induced by this capacitor discharge in primary winding 43 is transferred to secondary winding 45 and causes ignition of the quench tube 47 via the ignition electrode 46 of said quench tube. This causes the flash tube 6, which is connected in parallel to the quench tube to be extinguished, thus terminating the light flash.

In some applications, it may be advantageous in both preferred embodiments (FIGS. 1 and 2) to furnish a different operating voltage for the measuring and control circuit in dependence on whether the switching position S or A is being used. For example, in one of the switching positions, the operating voltage may be derived from resistor 18 as shown in FIGS. 1 and 2, while in the other switching position, the voltage may be derived from a resistor which either is larger or smaller than resistor 18.

While the invention has been illustrated and described as embodied in a measuring and control circuit, it is not intended to be limited to the details shown, since various modifications, circuit variations and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be protected by Letters Patent is set forth in the appended claims:

1. Electronic flash unit for use in a photographic process, comprising, in combination, light-flash-generating means for generating a light flash in response to a generating control signal applied thereto; means connected to said light-flash-generating means for furnishing said generating control signal under operator control; terminating means connected to said light-flash-generating means, for terminating said light flash in response to a terminating control signal applied to said terminating means; measuring and control circuit means having a photoelectric element mounted to receive light indicative of the light utilized in said photographic process, said measuring and control circuit means furnishing received light signal when the quantity of light falling on said photoelectric element has reached a predetermined value; and switching means having a first state connecting said measuring and control circuit means to said terminating means, and an externally selectable second state disconnecting said measuring and control circuit means from said terminating means and connecting said measuring and control circuit to said light-flash-generating means, whereby said received light signal functions as said terminating control signal terminating the flash generated by said light-flash-generating means when in said first state and functions as said generating control signal initiating said light flash in response to externally furnished illumination when said switching means are in said second state.

2. An electronic flash unit as set forth in claim 1, wherein said received light signal is a pulse.

3. An electronic flash unit as set forth in claim 1, wherein said switching means comprise mechanical switching means, said first and second state respectively corresponding to a first and second switching position.

4. An electronic flash unit as set forth in claim 1, wherein said photographic process is the photographing of an object; and wherein the light utilized in the photoelectric process is the light reflected from said object.

5. An electronic flash unit as set forth in claim 1, wherein said light-flash-generating means comprise a flash tube, having a flash-tube ignition circuit, adapted to generate said light flash in response to a control signal applied to said flash-tube ignition circuit; and wherein said terminating means comprise a quench tube, connected in parallel with said flash tube, said quench tube having a quench-tube ignition circuit, said quench tube being adapted to substantially short circuit said flash tube in response to a control signal applied to said quench-tube ignition circuit.

6. An electronic flash unit as set forth in claim 5, wherein said externally furnished illumination is derived from a second electronic flash unit.

7. An electronic flash unit as set forth in claim 5, wherein said switching means are adapted to connect the output of said measuring and control circuit means to said flash-tube ignition circuit when in said first switching position, and to said quench-tube ignition circuit when in said second switching position.

8. An electronic flash unit as set forth in claim 7, further comprising first and second operating voltage furnishing means for furnishing an operating voltage to said measuring and control circuit means, said second operating voltage furnishing means being adapted to furnish said operating voltage only during the presence of a flash in said flash tube; and wherein said switching means are further adapted to connect said first operating voltage furnishing means to said measuring and control circuit means when in said first switching position, and said second operating voltage furnishing means to said measuring and control circuit means when in said second switching position.

9. An electronic flash unit as set forth in claim 8, wherein said switching means have a third switching position wherein said measuring and control circuit means is disconnected from both said first and said second operating voltage-furnishing means.

10. An electronic flash unit as set forth in claim 7, wherein said switching means further have a third switching position wherein said output of said measuring and control circuit means is disconnected both from said flash-tube ignition circuit and said quench-tube ignition circuit.

* * * * *